(12) United States Patent
Kong

(10) Patent No.: US 7,383,645 B2
(45) Date of Patent: Jun. 10, 2008

(54) DRYER EXHAUST PIPE WITH DIFFERENT RIM SIZE

(75) Inventor: Tae Sick Kong, Masan-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/337,795

(22) Filed: Jan. 24, 2006

(65) Prior Publication Data

US 2006/0162179 A1 Jul. 27, 2006

(30) Foreign Application Priority Data

| Jan. 25, 2005 | (KR) | 10-2005-0006667 |
| Jan. 25, 2005 | (KR) | 10-2005-0006668 |
| Jan. 25, 2005 | (KR) | 10-2005-0006669 |
| Jan. 25, 2005 | (KR) | 10-2005-0006670 |

(51) Int. Cl.
*F26B 11/02* (2006.01)

(52) U.S. Cl. ...................................................... 34/601

(58) Field of Classification Search ................ 34/140, 34/595, 601, 602, 603, 606; 68/5; 454/359
See application file for complete search history.

(56) References Cited

U.S. PATENT DOCUMENTS

| 4,151,789 | A | * | 5/1979 | Grobard | 454/359 |
| 5,584,129 | A | * | 12/1996 | Williamson | 34/235 |
| 6,098,312 | A | * | 8/2000 | Tuggle | 34/607 |
| 6,195,910 | B1 | * | 3/2001 | Robineau | 34/417 |

* cited by examiner

*Primary Examiner*—S. Gravini
(74) *Attorney, Agent, or Firm*—Ked & Associates, LLP

(57) ABSTRACT

An exhaust dryer including an improved exhaust pipe assembly is provided. The dryer includes a body for holding laundry therein, a fan unit for blowing hot air produced by a heater onto the laundry to dry the laundry, and an exhaust pipe assembly connected to an exhaust hole at one side of the body for discharging air to an outside of a room. The exhaust pipe assembly may include a telescopic type straight pipe portion which is extendable, with a fastening means that secures a position of the exhaust pipe assembly relative to the room. An end cap may be provided at a discharge end of the exhaust pipe assembly to direct a flow of discharge air.

20 Claims, 13 Drawing Sheets

DRYER EXHAUST PIPE WITH DIFFERENT RIM SIZE

CROSS-REFERENCE TO RELATED APPLICATIONS

This application claims the benefit of Korean Application Nos. P2005-6667 to P2005-6670, all filed on Jan. 25, 2005, which are hereby incorporated by reference as if fully set forth herein.

BACKGROUND OF THE INVENTION

1. Field of the Invention

The present invention relates to dryers, and more particularly, to an exhaust dryer in which an exhaust pipe assembly thereof is modified for enhancing convenience of use and product reliability.

2. Discussion of the Related Art

In general, the laundry dryer blows hot air from a heater to a drum for evaporating moisture from laundry, to dry the laundry. In the laundry dryers, there are exhaust type dryers, and condensing type dryers depending on methods for processing moist air evaporated from the laundry.

The exhaust type dryer draws external air, heats the air with the heater, dries the laundry with heat air, and discharges moist air from the laundry to an outside of the dryer. The condensing type dryer condenses the moist air from the laundry, and reheats the air for drying the laundry.

FIG. 1 illustrates a side view of a related art exhaust type dryer having an exhaust pipe assembly mounted thereto.

Referring to FIG. 1, the related art dryer is provided with a body 10 which forms an exterior of a whole dryer, having an exhaust hole 11 for discharging exhaust air, and an exhaust pipe assembly 12 connected to the exhaust hole 11 for guiding the exhaust air to an outside of room.

Though not shown, the dryer is provided with a drum in the body for holding the laundry, the heater, and a fan unit.

The dryer draws external air, heats the air with the heater, supplies hot air to the laundry by means of the fan unit. The laundry is dried by the hot air, and moist air produced in this time is discharged to an outside of the dryer as an exhaust air.

The exhaust air is discharged to an outside of room through the exhaust pipe assembly.

The exhaust pipe assembly 12 is provided with a bellows pipe 13 fastened to an outside circumference of the exhaust hole 11 with a clamp or the like, and extended to an outside of room for discharging the exhaust air to an outside of room, and a hood exhaust pipe 20 connected to the bellows pipe so as to be projected to the outside of room.

The bellows pipe 13 may have a plurality of pipes attached together with adhesive tapes as required, or instead of the bellows pipe, a long piece of straight pipe may also be used.

However, though mounting of the exhaust pipe assembly 12 with the bellows pipe of the related art exhaust type dryer is easy, the bellows pipe is susceptible to an external impact, and difficult to secure to a wall.

Moreover, the bellows pipe having a plurality of pipes attached together, or a long straight pipe, is liable to fail to exhaust to the outside of room perfectly, but have the exhaust air leaked into the room depending on adhered state of the tapes, or has difficulty in mounting because change of direction of the pipe is not possible. Moreover, the difficulty in adjustment of a total length of the exhaust pipe assembly causes to require much time in mounting the dryer.

In the meantime, the bellows pipe 13 is mounted along the wall 'W', and the hood exhaust pipe 20 is passed through the wall 'W' for discharging the exhaust air to the outside of room.

However, the related art exhaust type dryer has a problem in that the hood exhaust pipe 20 passed through the wall 'W' is susceptible to damage by friction with the wall 'W' if the hood exhaust pipe 20 shakes by the exhaust air or an outdoor wind.

Moreover, there can be infiltration of rain between the wall 'W' and the exhaust pipe 20, and the exposure of a pass through hole in the wall 'W' for pass through of the hood exhaust pipe 20 is liable to impair an outside appearance of exterior or interior.

FIG. 2 illustrates an enlarged perspective view of "A" part in FIG. 1, i.e., a hood exhaust pipe of the related art dryer.

Referring to FIG. 1 or 2, the hood exhaust pipe 20 of the related art dryer has one end connected to the bellows pipe 13 on a side of a dryer body, and the other end passed through the wall, and opened to outside of room to form an end of the exhaust pipe assembly 12.

The exhaust pipe assembly 12 has an opening EO opened fully to an outside of room, at an end thereof, i.e., at the other end of the hood exhaust pipe, and exhaust holes 21 in an outside circumference of the other end, for discharging the exhaust air through the opening and the exhaust holes in a direction of arrows 'E'.

However, the fully opened opening EO for discharging the exhaust air to an outside of room is liable to drop a performance of the dryer 10 due to failure in smooth discharge of the exhaust air if an against wind rushes to an inside of the hood exhaust pipe 20. Moreover, the possible entrance of birds, or mouse or dirt through the opening in the hood exhaust pipe is liable to damage the hood exhaust pipe 20, or impair a performance of the dryer.

SUMMARY OF THE INVENTION

Accordingly, the present invention is directed to a dryer that substantially obviates one or more problems due to limitations and disadvantages of the related art.

An object of the present invention is to provide a dryer which enables continuous circulation of air through insides of a drying drum and a cabinet for drying laundry, and uniform dry of the laundry in the cabinet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dryer includes a body for holding laundry therein, a fan unit for blowing hot air produced by a heater to the laundry, for drying the laundry, an exhaust pipe assembly connected to an exhaust hole at one side of the body for discharging air having the laundry dried thereby to an outside of room, the exhaust pipe assembly having a telescopic type straight pipe portion which is extendable.

Preferably, the exhaust pipe assembly includes a hood exhaust pipe passed through a wall and opened to outdoors, and further includes an elbow connected thereto for enabling direction change of the straight pipe portion.

Preferably, the elbow is a bellows pipe, and the elbow is provided to each place where the straight pipe portion is connected to the exhaust hole, and/or the straight pipe portion is connected to the hood exhaust pipe.

The exhaust pipe assembly further includes a hood guide for fastening the hood exhaust pipe to a wall, and closing a pass through hole having the hood exhaust pipe passed therethrough.

The hood guide is a plate shaped member having an insertion hole formed therein for placing the hood exhaust pipe therein, with fastening holes around the insertion hole for fastening the hood guide to a wall with fastening members.

Preferably, the hood guide includes an inside hood guide provided to a room side wall, and an outside hood guide provided to an outdoor side wall.

The outside hood guide is positioned lower than the inside hood guide so that the hood exhaust pipe is sloped down on the outdoor side.

In the meantime, the telescopic type straight pipe portion includes an outer exhaust pipe, and an inner exhaust pipe slidably mounted in the outer exhaust pipe Preferably, the outer exhaust pipe and the inner exhaust pipe of the straight pipe portion of the exhaust pipe assembly include a stopper and a first rim respectively for preventing the outer exhaust pipe and the inner exhaust pipe from separating from each other.

Preferably, the inner exhaust pipe includes a second rim at an end, having a diameter greater than an inside diameter of the outer exhaust pipe, for preventing the inner exhaust pipe from being placed in the outer exhaust pipe, fully.

The exhaust pipe assembly may further include an end cap at an outdoor end of the hood exhaust pipe for reducing an opening sectional area of the hood exhaust pipe.

Preferably, the hood exhaust pipe includes a plurality of exhaust holes formed along a circumferential direction of the outdoor side end of the hood exhaust pipe. Preferably, the end cap is mounted spaced a predetermined distance from the hood exhaust pipe, and includes connection members for connecting the hood exhaust pipe to the end cap.

The end cap may have a conical shape, and include a cap for placing in the hood exhaust pipe, and a holding portion on an outside of the hood exhaust pipe for attachment of the connection member thereto.

The cap may have a conical shape, and the holding portion may be cylindrical.

Preferably, the exhaust pipe assembly further includes fastening means between the wall and the exhaust pipe assembly for fastening the exhaust pipe assembly to the wall.

Preferably, the fastening means includes a fastening bracket for fastening to the wall, an exhaust pipe holder for surrounding one side of the straight pipe portion, and an adjusting member for connecting the fastening bracket and the exhaust pipe holder.

Moreover, the adjusting member includes a bolt for varying a distance between the fastening bracket and the exhaust pipe holder by fastening/unfastening the bolt.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
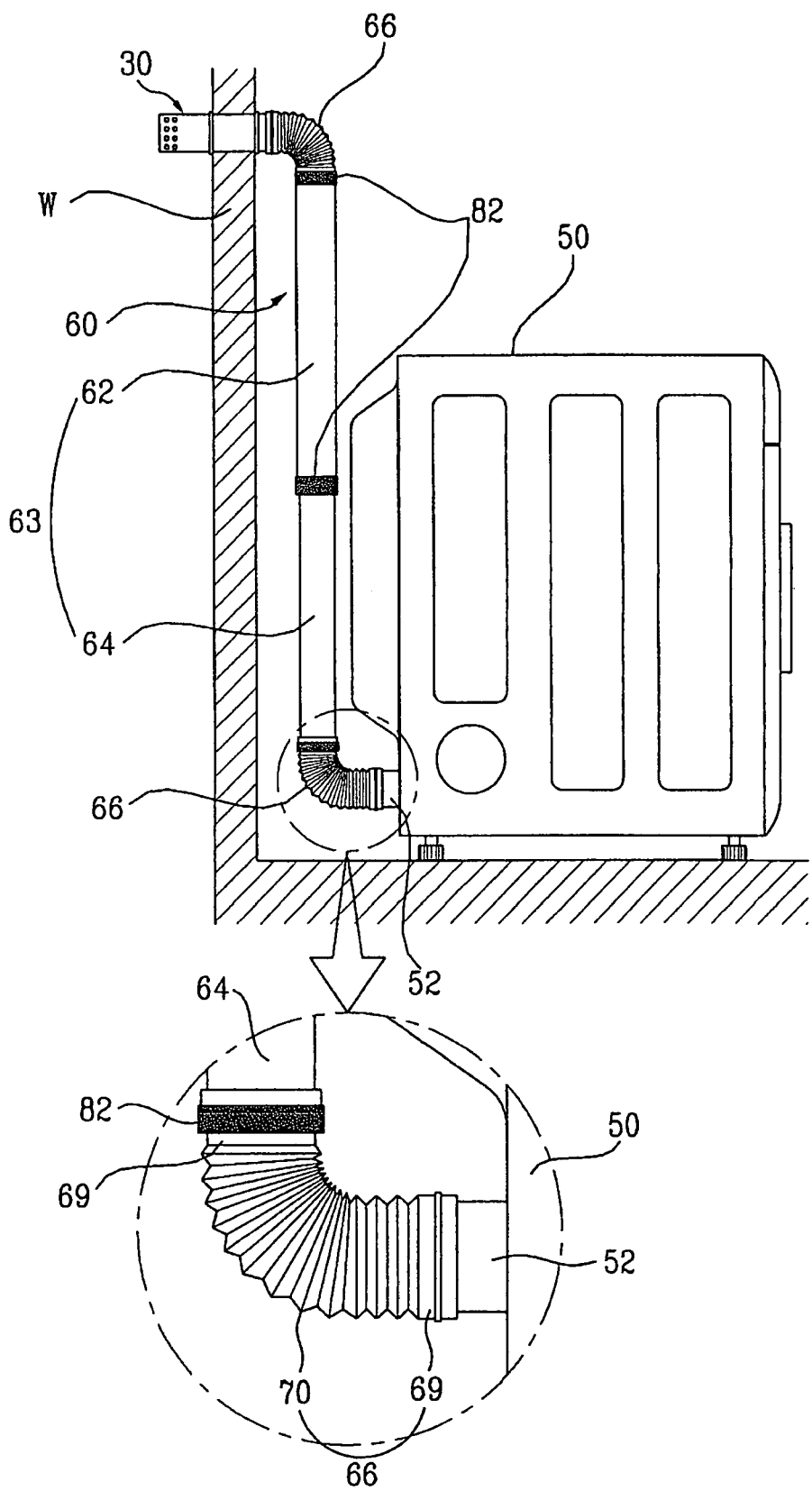
FIG. 3 illustrates a side view of an inner exhaust pipe and an enlarged view of an outer exhaust pipe in accordance with a preferred embodiment of the present invention.
Figure 4:
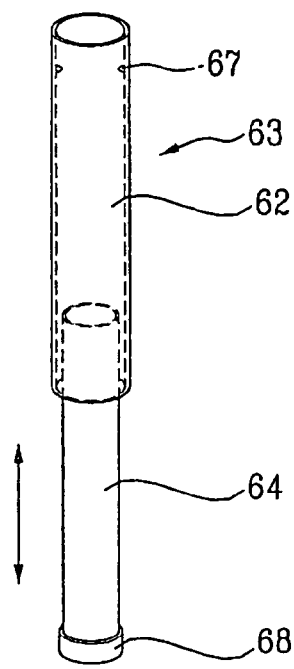
FIG. 4 illustrates a perspective view of an inner exhaust pipe and an outer exhaust pipe in accordance with a preferred embodiment of the present invention.
Figure 5:
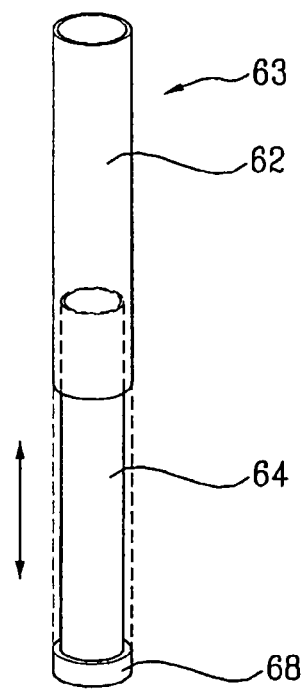
FIG. 5 illustrates a perspective view of an inner exhaust pipe and an outer exhaust pipe in accordance with another preferred embodiment of the present invention.

FIG. 3 illustrates a side view of an exhaust type dryer having an exhaust pipe assembly mounted thereto in accordance with a preferred embodiment of the present invention, FIG. 4 illustrates a perspective enlarged view of a telescopic type straight pipe portion of an exhaust pipe assembly in accordance with a preferred embodiment of the present invention, and FIG. 5 illustrates a perspective enlarged view of a telescopic type straight pipe portion of an exhaust pipe assembly in accordance with another preferred embodiment of the present invention.

Figure 1:
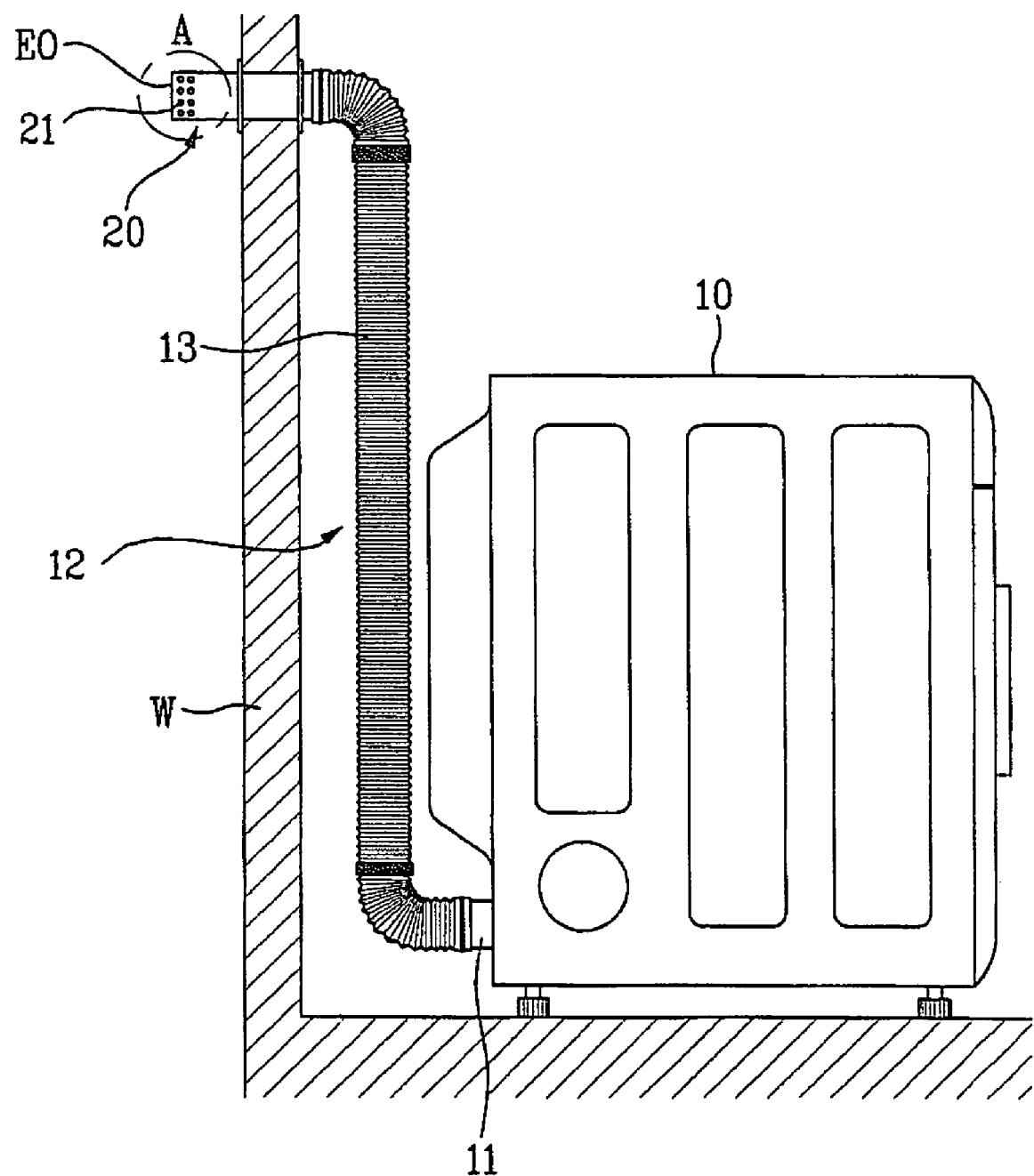
FIG. 1 illustrates a side view of a related art exhaust type dryer having an exhaust pipe assembly mounted thereto.
Figure 2:
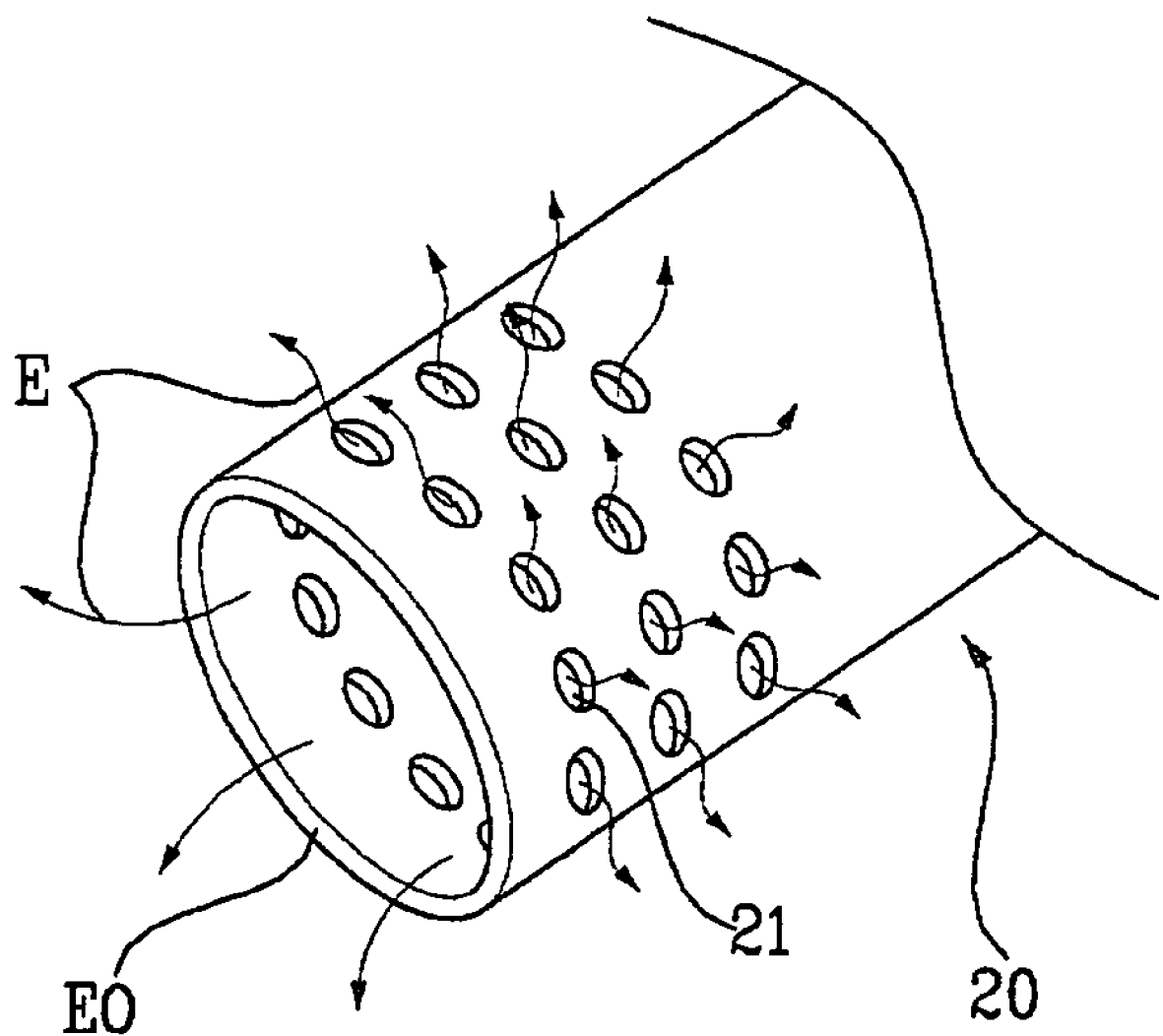
FIG. 2 illustrates an enlarged perspective view of "A" part in FIG. 1.

FIGS. 3 to 5 each illustrates an exhaust pipe assembly in accordance with a preferred embodiment of the present invention focusing on character of a straight portion thereof distinctive from the related art dryer in FIGS. 1 to 2.

Referring to FIG. 3, the exhaust pipe assembly in accordance with a preferred embodiment of the present invention includes a body 50 having an exhaust hole 52 at one side for discharging air having laundry dried thereby to an outside of room, and an exhaust pipe assembly 60 connected to the exhaust hole 52 for guiding exhaust air to an outside of room. The exhaust pipe assembly 60 includes a telescopic straight pipe portion 63.

The straight pipe portion 63 may include an outer exhaust pipe 62 and an inner exhaust pipe 64 slidably mounted in an outer exhaust pipe 62 for varying a length thereof, or, not only the two stages as shown in the drawing, but also a plurality of stages.

In the meantime, it is preferable that the exhaust pipe assembly in accordance with a preferred embodiment of the present invention includes a hood exhaust pipe 30 passed through a wall 'W' for discharging exhaust air to an outside of room.

It is preferable that the exhaust pipe assembly 60 of the dryer further includes an elbow 66 for enabling direction change of the straight pipe portion 62.

Preferably, the elbow 66 has a bellows pipe shape with a connection portion 69 at each end, and a bellows portion 70 which is bendable in the middle, by utilizing which the direction of the straight pipe potion can be changed in various directions.

It is preferable that the elbow 66 is connected to a place the straight pipe portion 63 is connected to the exhaust hole 52 or to the hood exhaust pipe 30.

The connection portion 69 of the elbow may be a cylindrical pipe having a diameter greater than a diameter of the exhaust hole, and smaller than a diameter of the straight pipe portion.

In this case, the exhaust hole 52 is placed in the connection portion 69 at one side of the elbow, and fastened with a clamp or the like on an outer side of the connection portion 69. The connection portion 69 at the other side of elbow may be placed in, and secured to the straight pipe portion. Of course, as generally drawn, it is required that leakage of the exhaust air is prevented with an aluminum tape 82 or the like.

Since a portion joined with the aluminum tape has a step, a sealing effect of the aluminum tape is better than other case two pipe with the same diameters are joined.

It is preferable that the dryer body 50 is installed spaced a predetermined distance away from the wall 'W' so that the exhaust hole 52 is projected from a lower side of the dryer body 50 toward the wall and the exhaust pipe assembly 60 is in communication with the exhaust hole 52. In this instance, it is preferable that the elbow 66 is bent at a right angle for making the straight pipe portion 63 and the exhaust hole 52 in communication. This is for maintaining a distance between the wall and the dryer body minimum.

It is preferable that the straight pipe portion 63 is of telescopic type. For this, the outer exhaust pipe 62 and the inner exhaust pipe 64 are straight pipes, and for slidable mounting of the inner exhaust pipe 64 in the outer exhaust pipe 64, it is preferable that the outer exhaust pipe 64 has an inside diameter greater than an outside diameter of the inner exhaust pipe 64.

In the meantime, referring to FIG. 4, if the straight pipe portion is a two staged telescopic type pipe, the outer exhaust pipe 62 may have a stopper 67 on an inside circumference of one end thereof for preventing the inner exhaust pipe 64 from separating. The inner exhaust pipe 64 is placed in the outer exhaust pipe 62, and the inner exhaust pipe 64 has a first rim at the other end thereof, having an outside diameter smaller than an inside diameter of the outer exhaust pipe 62 for being held at the stopper 67 when the length is varied.

Referring to FIG. 5, the straight pipe portion of the present invention may have a second rim 68 at an end of the inner exhaust pipe 64 having an outside diameter greater than the inside diameter of the outer exhaust pipe 62.

In the meantime, it is preferable that aluminum tapes 82 are taped on a portion where the inner exhaust pipe is placed in the outer exhaust pipe, a portion where the elbow is connected to the straight pipe portion, and so on. Since such portions have steps, firm sealing with the aluminum tapes is possible.

The connection operation of the exhaust pipe assembly having the telescopic type of straight pipe portion to the exhaust type dryer of the present invention will be described.

At first, the connection portion 69 of the elbow 66 is placed on an outside circumference of the exhaust pipe 52, and fastened the connection portion 69 with a fastening member, such as a clamp. Then, the bellows portion 70 is bent such that the elbow 66 is placed in the straight pipe portion 63 arranged vertically over the elbow 66.

Then, the connection portion 69 is placed in the outer exhaust pipe 62 or the inner exhaust pipe 64 of the straight pipe portion 63. In this instance, the inner exhaust pipe 64 is drawn out from the outer exhaust pipe 62 to lengthen a total length of the straight pipe portion.

Or, it is also possible that the inner exhaust pipe 64 is slidably drawn out through an upper side of the outer exhaust pipe 62 by holding and drawing the second rim 68 upward.

Accordingly, the inner exhaust pipe 64 is slides out from the outer exhaust pipe in a vertical direction, until the straight pipe portion 63 of the exhaust type dryer meets a user's desired height.

Then, upon taping the aluminum tape 82 on the connection portions of the elbow 66 and the straight pipe portion 63 respectively, leakage of the exhaust pipe through the exhaust pipe assembly 60 can be prevented.

Figure 6:
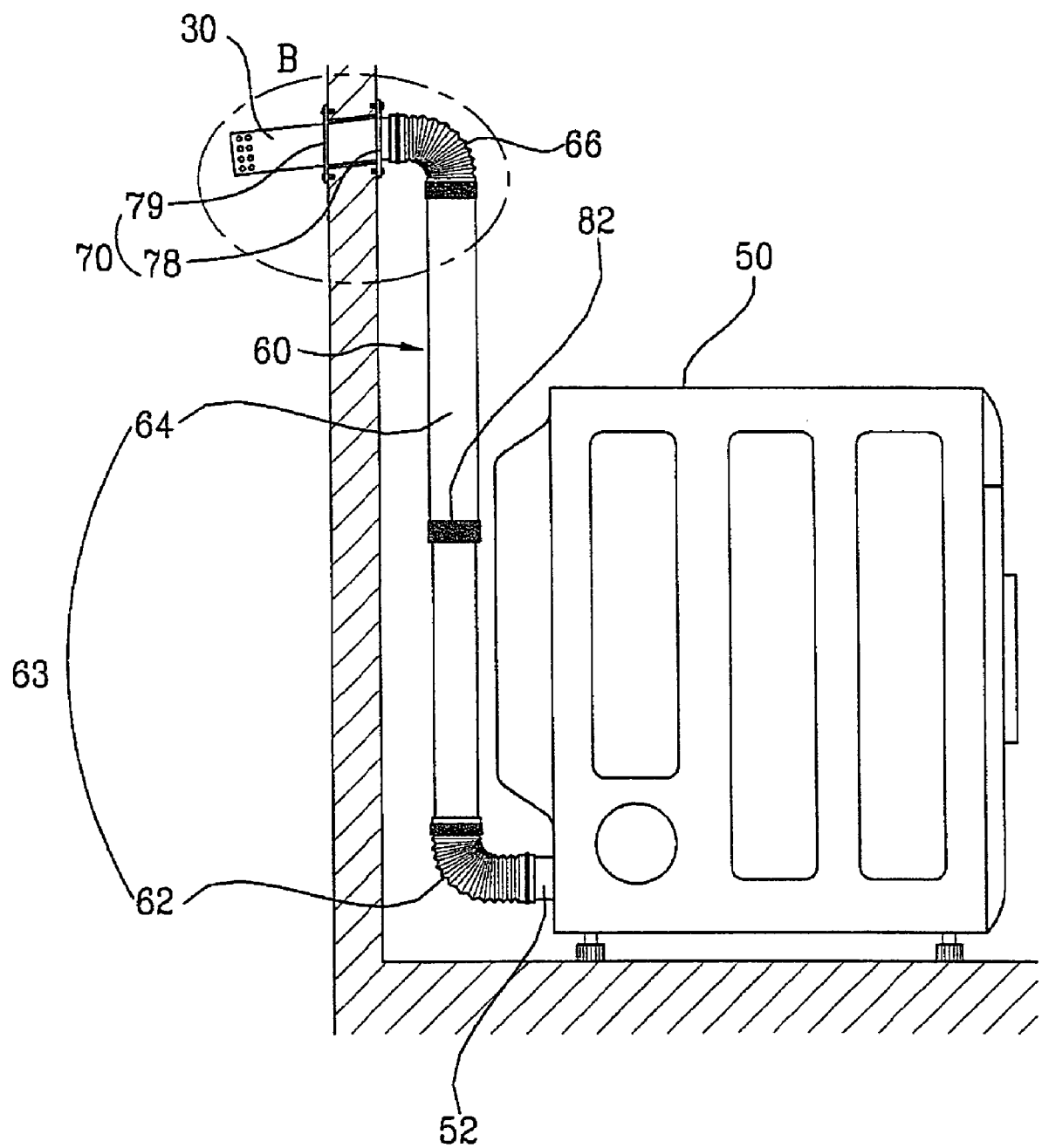
FIG. 6 illustrates a side view of an exhaust type dryer having an exhaust pipe assembly mounted thereto in accordance with another preferred embodiment of the present invention.
Figure 7:
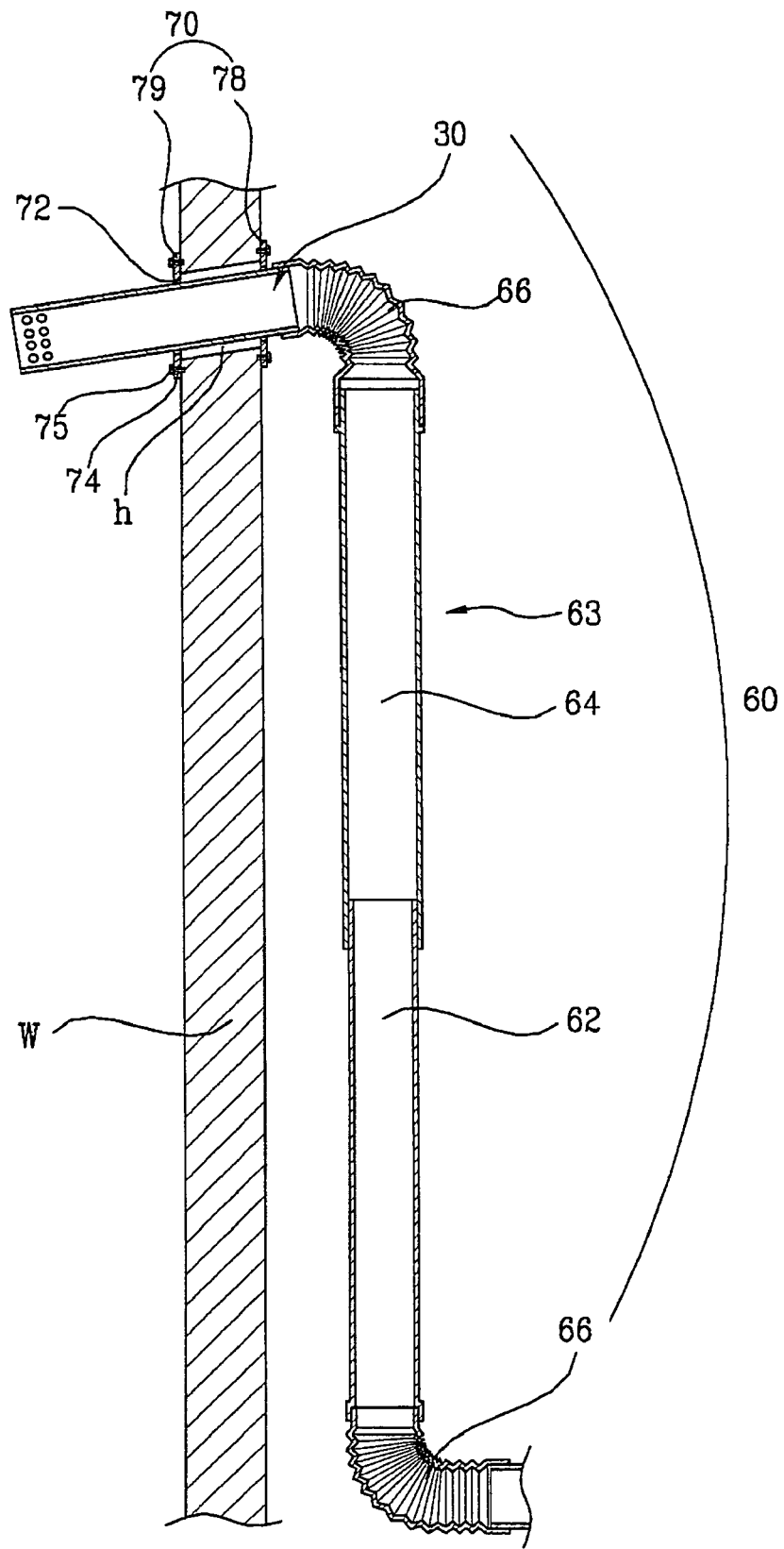
FIG. 7 illustrates a section of an exhaust pipe assembly having the hood guide in FIG. 6 provided thereto.
Figure 8:
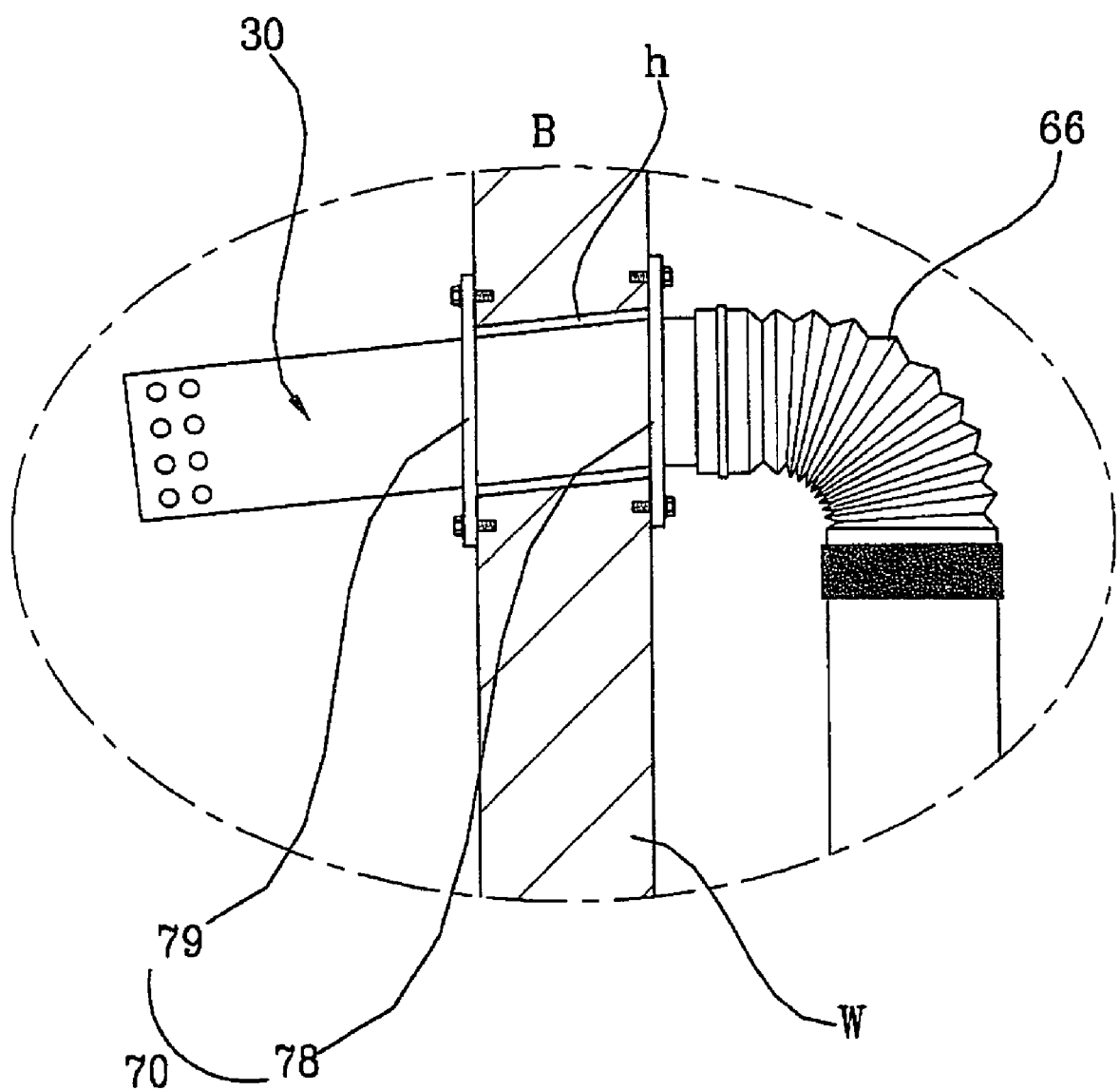
FIG. 8 illustrates an enlarged section of an exhaust pipe assembly having the hood guide in FIG. 6 provided thereto.

FIG. 6 illustrates a side view of an exhaust type dryer having an exhaust pipe assembly mounted thereto in accordance with another preferred embodiment of the present invention, FIG. 7 illustrates a section of an exhaust pipe assembly having the hood guide in FIG. 6 provided thereto, and FIG. 8 illustrates an enlarged section of an exhaust pipe assembly having the hood guide in FIG. 6 provided thereto.

FIGS. 6 to 8 each illustrates an exhaust pipe assembly in accordance with a preferred embodiment of the present invention focusing on character of a hood guide thereof distinctive from the related art dryer in FIGS. 1 to 2.

Referring to FIG. 6, the exhaust pipe assembly of a dryer in accordance with a preferred embodiment of the present invention may further include a hood guide 70.

Referring to FIGS. 6 and 7, the hood guide 70 is a plate shaped member having an insertion hole 72 with fastening holes 74 for fastening to a wall with fastening members 75. It is preferable that the plate shaped member is circular.

It is preferable that the insertion hole 72 has a diameter slightly greater than a diameter of the exhaust pipe assembly 60 for inserting the exhaust pipe assembly, closely. Of course, it is preferable that a portion that is to be placed in the insertion hole 72 is the hood exhaust pipe 30 of the exhaust pipe assembly.

Preferably, the hood guide 70 includes an inside hood guide 78 to be mounted on an inside wall, and an outside hood guide 79 to be mounted on an outside wall.

The inside hood guide 78 has the hood exhaust pipe 30 placed in the insertion hole 72 for guiding the exhaust pipe assembly 60, and secured to a room side of the pass through hole 'h' for closing the pass through hole 'h' in the room side wall 'W'.

Alikely, the outside hood guide 79 has the hood exhaust pipe 30 placed in the insertion hole 72 for guiding the exhaust pipe assembly 60, and secured to an outdoor side of the pass through hole 'h' for closing the pass through hole 'h' in the outdoor side wall 'W'.

Moreover, the outside hood guide 79 is mounted at a position lower than the inside hood guide 78 so that the exhaust pipe assembly 60 is sloped down toward the outside of the room.

That is, the hood exhaust pipe 30 is sloped down in a direction of the outside of the room, so that foreign matters or rain water infiltrated through the hood exhaust pipe 30 is prevented from entering into an inner side of the exhaust pipe assembly 60. Of course, it is preferable that a gap between the hood exhaust pipe 30 and the hood guide 70 is finished with silicone.

A dryer in accordance with another preferred embodiment of the present invention will be described with reference to FIGS. 9 and 10.

Figure 9:
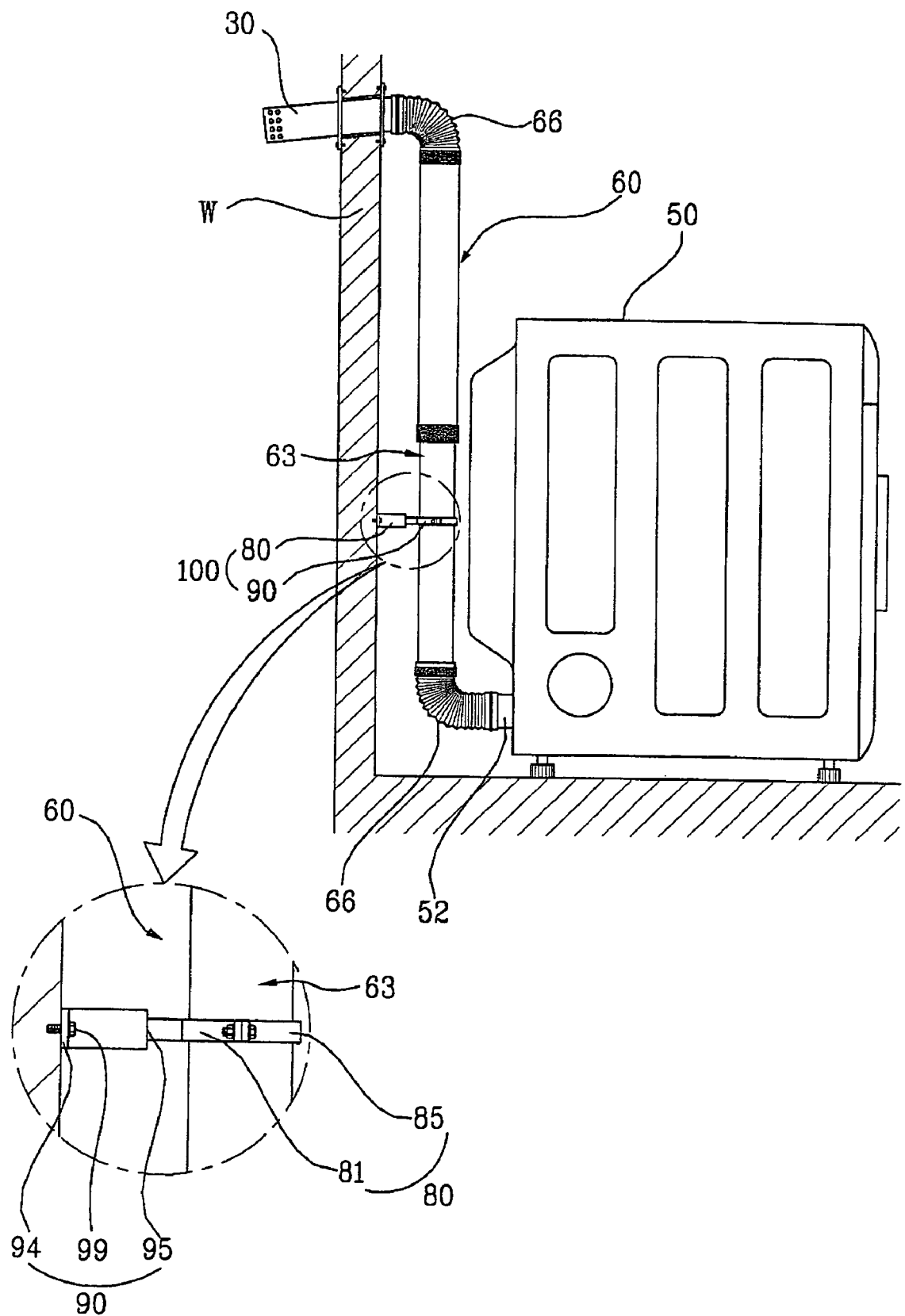
FIG. 9 illustrates a side view of an exhaust type dryer having an exhaust pipe assembly mounted thereto in accordance with another preferred embodiment of the present invention.
Figure 10:
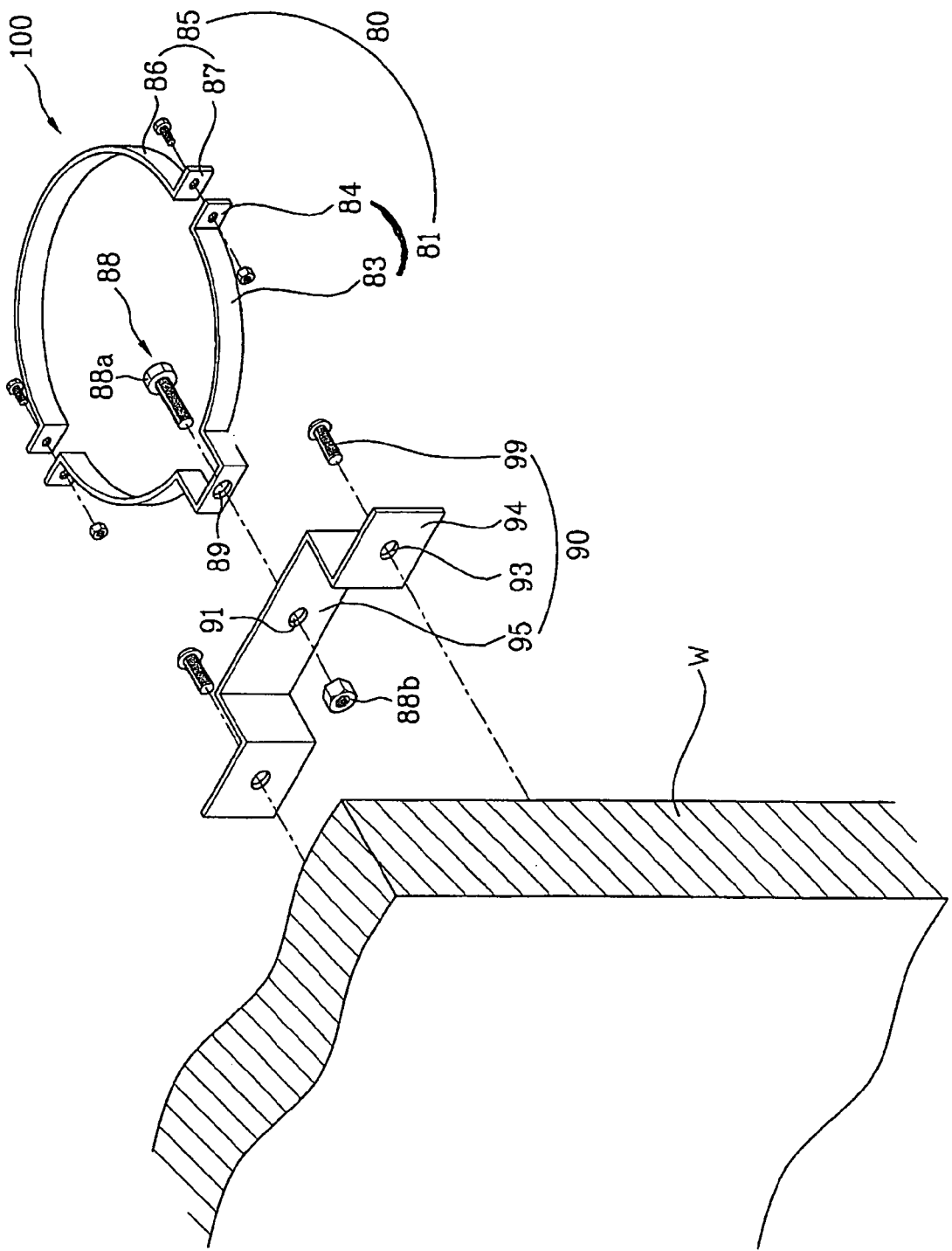
FIG. 10 illustrates an exploded, enlarged perspective view of the fastening means in FIG. 9.

FIG. 9 illustrates a side view of an exhaust type dryer having an exhaust pipe assembly mounted thereto in accordance with another preferred embodiment of the present invention, and FIG. 10 illustrates an exploded, enlarged perspective view of the fastening means in FIG. 9.

Referring to FIG. 9, an exhaust pipe assembly 60 in the exhaust type dryer in accordance with another preferred embodiment of the present invention further includes fastening means 100. Preferably, the fastening means is mounted between a straight portion of the exhaust pipe assembly 60 and a wall 'W'.

Moreover, referring to FIGS. 9 and 10, the fastening means 100 includes a bracket 90 for fastening to a wall 'W', and an exhaust pipe holder 80 for surrounding one side of the exhaust pipe assembly 60.

The fastening bracket 90 includes a fastening portion 94 having fastening holes 93 for fastening with fastening bolts 99, and a connection portion 95 for fastening the exhaust pipe holder 80 thereto.

The exhaust pipe holder 80 has a ring shape for surrounding the exhaust pipe 60, and an adjusting means 88 for fastening the exhaust pipe holder 80 to the fastening bracket 90, and adjusting a distance between the exhaust pipe holder 80 and the fastening bracket 90.

The adjusting means 88 includes a bolt 88a and a nut 88b for varying the distance between the fastening bracket 90 and the exhaust pipe holder 80. Of course, a female thread may be formed in the hole 91 of the connection portion 95 for omitting the nut 88b.

The exhaust pipe holder 80 includes first, and second holders 81, and 85 for placing the exhaust pipe assembly 60 therein.

The first, and second holders 81, and 85 are opposite semicircular shapes, and has rings portions 83, and 86 each for surrounding one side of the exhaust pipe assembly 60, and bolt fastening portions 84, and 87 each at opposite ends of the ring portion 83, or 86, for placing fastening members therein for holding the first, and second holders 81, and 85 together.

The first holder 81 has a fastening hole 89 for pass through of the bolt 88a of the adjusting means 88 for connection to the connection means 95 of the fastening bracket 90. accordingly, the adjusting means 88 connects the fastening bracket 90 to the exhaust pipe holder 80, as well as can adjust the distance between the fastening bracket 90 and the exhaust pipe holder 80.

A fastening operation of the exhaust pipe assembly including the fastening means will be described.

At first, one end of the elbow 66 is placed in the exhaust hole 52, and one end of the straight pipe portion 63 is connected to the other end of the elbow 66.

Then, the straight pipe portion 63 is extended upward along the wall 'W' with a predetermined distance therefrom, and the other end is connected to the elbow 66 connected to the hood exhaust pipe 30.

In the meantime, as the bolt 88a of the adjusting means 88 is passed through the fastening hole 89 in the first holder 81, and the connection portion 95 of the fastening bracket 90, and fastened with the nut 88b, the first holder 81 and the fastening bracket 90 are connected such that the distance therebetween is adjustable.

The fastening bracket 90 is rigidly secured to the wall 'W' as the fastening portion 94 is put closely to the wall 'W' and a plurality of fastening bolts 99 are fastened through the fastening holes 93, respectively.

In the meantime, the exhaust pipe assembly, preferably the straight pipe portion 63, is fastened to the exhaust pipe holder 80 as the straight pipe portion 63 is positioned between the ring portions 83, and 86 of the first, and second holders 81, and 85, and the bolts are placed in the bolt fastening portions 84, and 87, respectively.

The exhaust pipe assembly 60 fastened thus by above steps is prevented from shaking as the fastening means 100 holds the exhaust pipe assembly 60 to the wall 'W' rigidly at the time of vibration due to operation of the dryer.

Since the distance between the fastening bracket 90 and the exhaust pipe holder 80 can vary by means of the bolt 88a and the nut 88b of the adjusting means 88 taking a distance between the straight pipe 63 and the wall 'W' into account, the exhaust pipe assembly can be mounted easily according to various environment.

Other preferred embodiments of the present invention will be described with reference to FIGS. 11 to 15. The embodiments each has a modified outdoor end portion of the related art hood exhaust pipe shown in FIG. 2. Accordingly, FIGS. 11 to 14 each shows an enlarged outdoor end portion of the hood exhaust pipe of the exhaust pipe assembly of the present invention.

Figure 11:
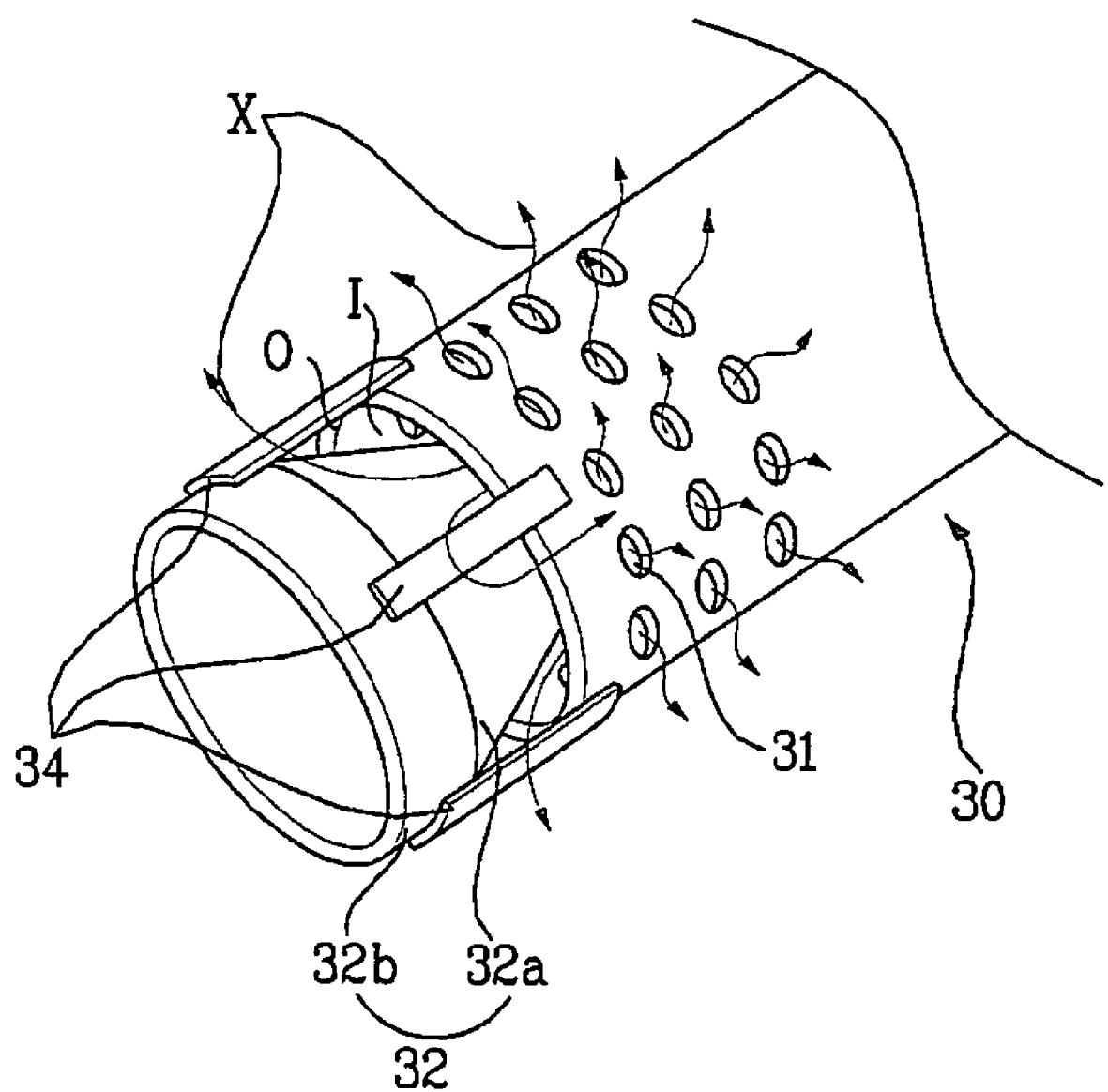
FIG. 11 illustrates an enlarged perspective view of a hood exhaust pipe of an exhaust pipe assembly in accordance with a preferred embodiment of the present invention.

Referring to FIG. 11, the hood exhaust pipe 30 of the exhaust pipe assembly of the present invention includes an end cap 32 connected to one side end of the hood exhaust pipe 30, and one or more than one connection member 34 for connecting the hood exhaust pipe and the end cap 32.

Figure 12:
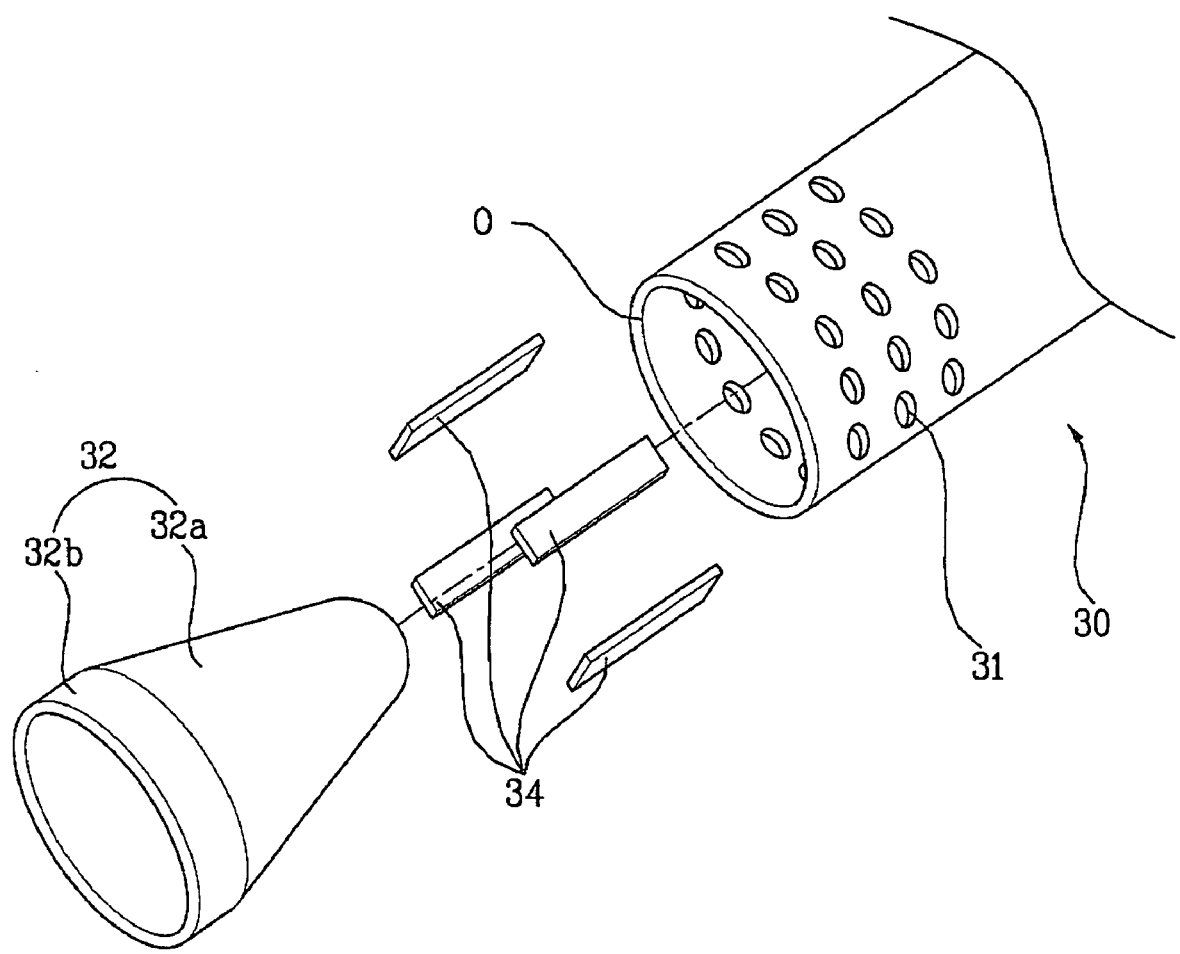
FIG. 12 illustrates an exploded perspective view of the hood exhaust pipe in FIG. 11.

Referring to FIGS. 11 and 12, the hood exhaust pipe 30 has an opened one side end 'O' projected to an outside of room, and a plurality of exhaust holes 31 in a circumferential direction in the vicinity of the one side end.

The end cap 32 includes a cap 32a to be placed in the hood exhaust pipe 30 through opened one side such that the cap 32 is positioned in the hood exhaust pipe 30 without contact thereto, and a holding portion 32b connected to the hood exhaust pipe 30 for holding the end cap 32.

The connection members 34 each is rectangular attached both to the end cap 32 and the hood exhaust pipe 30 with welding or the like.

In this instance, referring to FIG. 11, the end cap 32 is not in direct contact with the hood exhaust pipe 30, but connected to the hood exhaust pipe 30 with the connection members 34 such that a predetermined space 'I' is formed between the end cap 32 and the hood exhaust pipe 30.

Accordingly, referring to FIG. 11, the exhaust air from the dryer body 50 is discharged to an outside of room through the hood exhaust pipe 30, i.e., through the exhaust path 'X' of the space 'I' between the end cap 32 and the hood exhaust pipe 30 and the exhaust holes 31.

Moreover, the end cap 32 forms the space 'I', and connected to the hood exhaust pipe 30 with the connection members 34, but may not have the exhaust holes 31 formed therein. In this case, the exhaust air is discharged through the space 'I'.

It is preferable that the cap 32a has a cone shape for making a flow of the exhaust air discharging along the exhaust path 'X' toward the space 'I' or the exhaust holes 31 faster.

Of course, though it is not shown, the cap 32a may not have the cone shape, but stream line of the exhaust air. Moreover, the end cap may be hollow.

Figure 13:
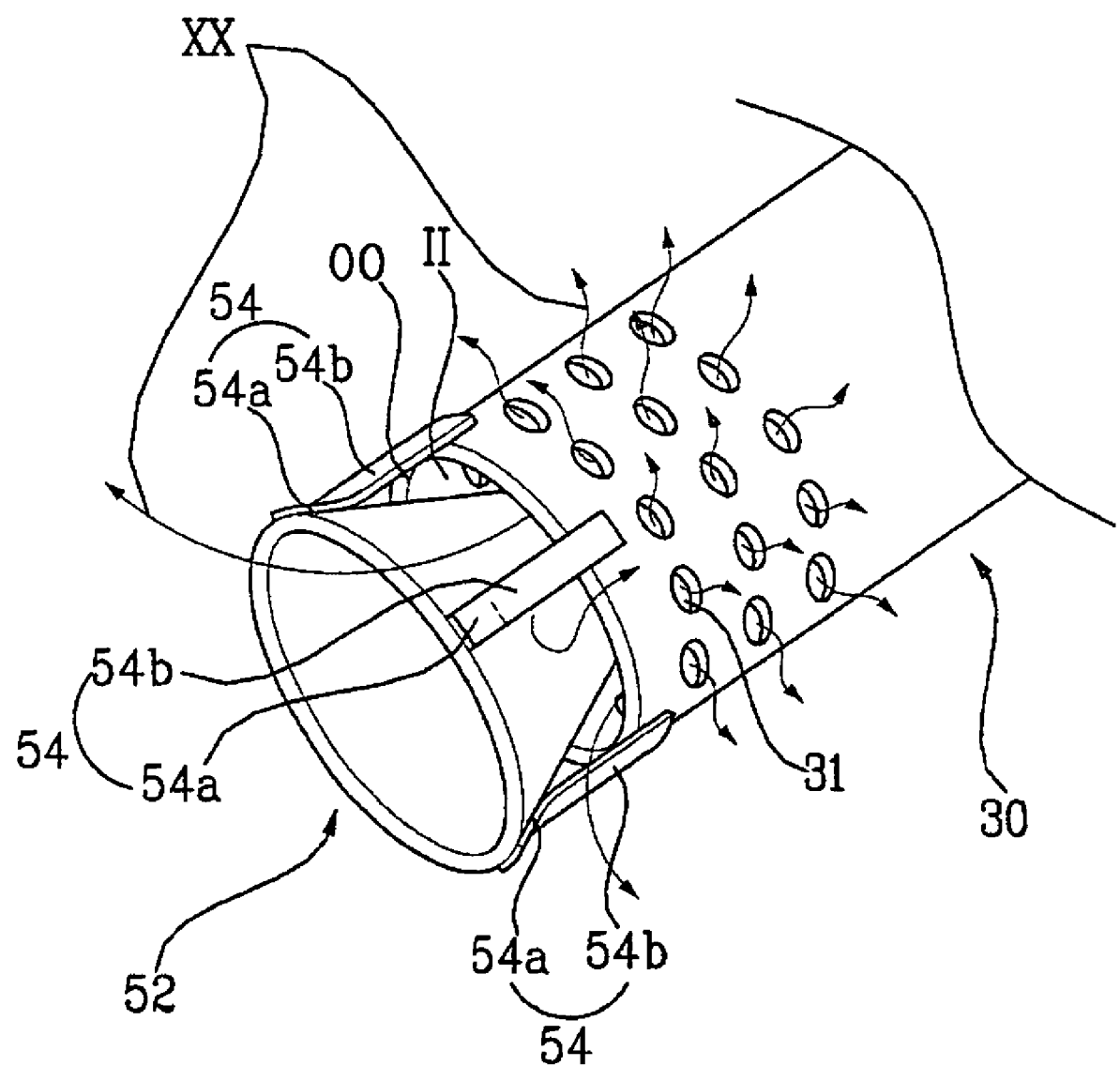
FIG. 13 illustrates an enlarged perspective view of a hood exhaust pipe of an exhaust pipe assembly in accordance with a preferred embodiment of the present invention.
Figure 14:
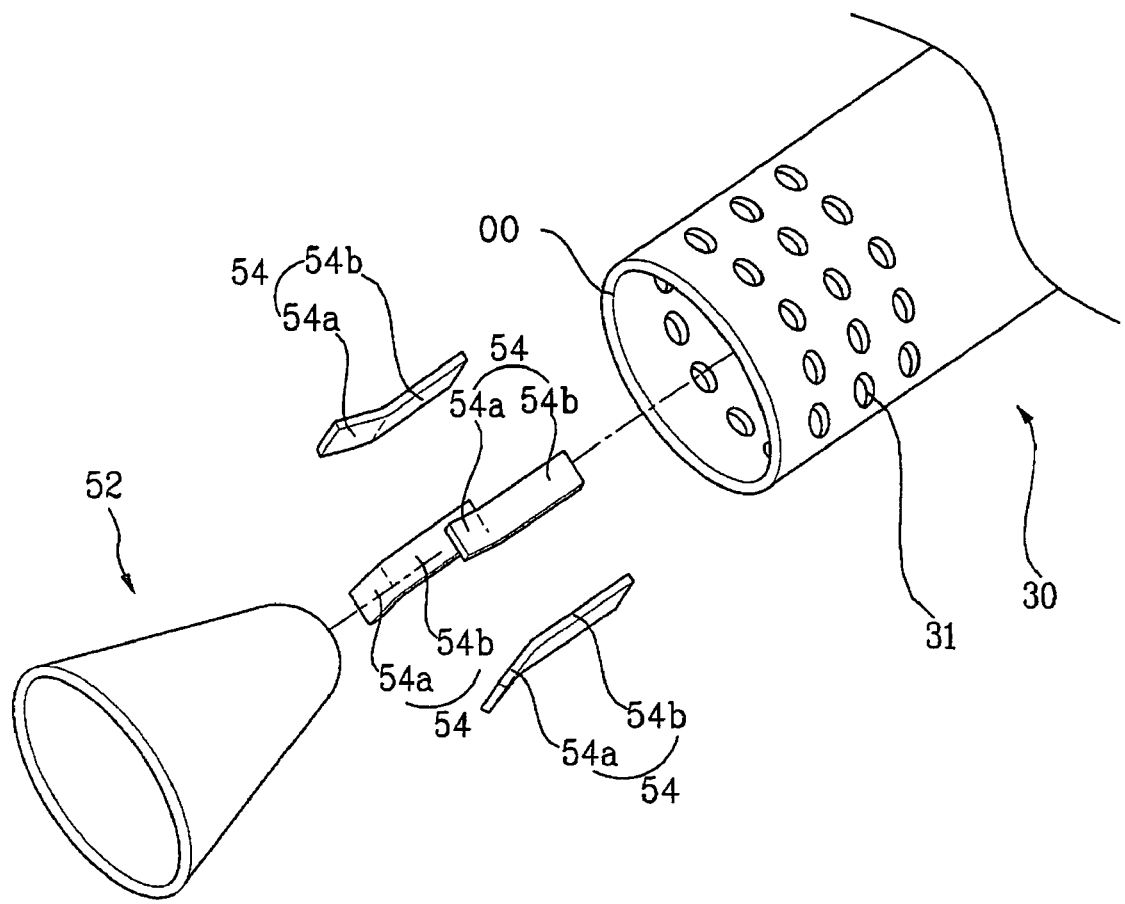
FIG. 14 illustrates an exploded perspective view of the hood exhaust pipe in FIG. 13.

FIGS. 13 and 14 each illustrates a hood exhaust pipe in accordance with another preferred embodiment of the present invention. Referring to FIGS. 13 and 14, the hood exhaust pipe 30 of a dryer includes an end cap 52 connected to one side end of the hood exhaust pipe 30, and one or more than one connection members 54 for connecting the hood exhaust pipe 30 to the end cap 52.

The end cap 52 has a cone shape, and placed in an end opening OO of the hood exhaust pipe 30.

Figure 15:
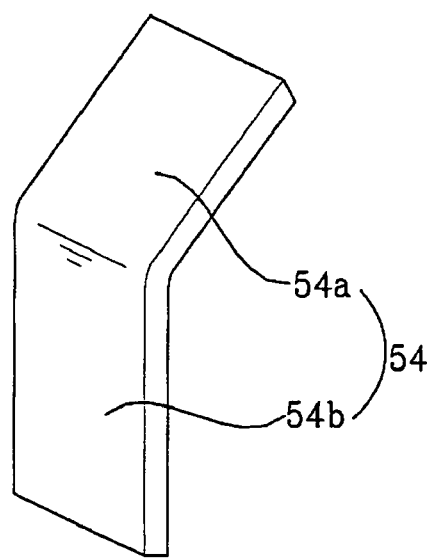
FIG. 15 illustrates a perspective view of the connection member in FIG. 13.

Referring to FIG. 15, the connection member 54 includes an end cap attachment portion 54a for attachment to an outside circumference of the end cap 52, and a hood exhaust pipe attachment portion 54b for attachment to an outside circumference of an end of the hood exhaust pipe 30. The end cap attachment portion 54a is bent outwardly from the hood exhaust pipe attachment portion 54b in conformity with a shape of the outside circumference of the end cap 52 where the end cap attachment portion 54b is attached.

The end cap 52 is connected, not to the hood exhaust pipe 30 directly, but, as shown in FIG. 13, to the hood exhaust pipe 30 with the connection members 54 to form a predetermined space "II".

The exhaust air is discharged to an outside of room through the hood exhaust pipe 30, i.e., as shown in FIG. 13, through discharge paths 'XX' of the space 'II' between the end cap 52 and the hood exhaust pipe 30, and the exhaust holes 31.

The end cap 52 has a conical shape for making an exhaust air flow in the discharge paths 'XX' toward the space 'II' and the exhaust holes 31 faster.

Of course, though not shown, the end cap 52 may not have the cone shape, but stream line of the exhaust air. Moreover, the end cap may be hollow.

Moreover, the end cap 52 forms the space 'II', and is connected to the hood exhaust pipe 30 with the connection members 54, and the hood exhaust pipe 30 may not have the exhaust holes 31. In this case, the exhaust air is discharged through the space 'II'.

Because the end cap 32 or 52 is connected to the opening in the hood exhaust pipe 30, the hood exhaust pipe of the exhaust pipe assembly of the present invention serves to prevent birds, and mice from entering into the hood exhaust pipe 30 through the opening in the hood exhaust pipe 30.

As has been described, the exhaust type dryer of the present invention has the following advantages.

First, because height adjustment and direction change of the exhaust pipe assembly is possible, a dryer can be provided, which can be installed easily, and the exhaust pipe assembly can be fastened more firmly.

Second, the hood guide mounted on the wall having the hood exhaust pipe passed therethrough enables to prevent the hood exhaust pipe from shaking, to improve reliability of the product.

Third, the hood guide enables to provide fine inside and outside views of the building, as well as to prevent infiltration of water through a pass through hole having the hood exhaust pipe passed therethrough.

Fourth, a dryer having reliability thereof improved can be provided by making the exhaust air discharged from the hood exhaust pipe smoothly, preventing against wind from entering into an inner side of the hood exhaust pipe, and preventing animals or foreign matters from entering into the hood exhaust pipe.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A dryer, comprising:
   a body that receives laundry therein;
   a fan that blows air onto the laundry to dry the laundry; and
   an exhaust pipe assembly connected to an exhaust hole at one side of the body so as to discharge air to an outside of a room that houses the dryer, wherein the exhaust pipe assembly comprises a telescoping straight pipe portion including an outer exhaust pipe and an inner exhaust pipe slidably coupled to the outer exhaust pipe such that the straight pipe portion is extendable to a plurality of lengths, wherein the outer exhaust pipe includes a stopper provided on an inner circumferential surface thereof, wherein the stopper limits movement of the inner exhaust pipe based on contact between a first rim at a first end of the inner exhaust pipe and the stopper so as to prevent separation of the inner and outer exhaust pipes, and wherein the inner exhaust pipe includes a second rim at a second end thereof, wherein a diameter of the second rim is greater than an inside diameter of the outer exhaust pipe such that the second rim limits insertion of the inner exhaust pipe into the outer exhaust pipe.

2. The dryer as claimed in claim 1, wherein the exhaust pipe assembly includes a hood exhaust pipe that passes through a wall of the room, with an outdoor end thereof open an outside of the room.

3. The dryer as claimed in claim 2, wherein the exhaust pipe assembly further includes an elbow connected to at least one end of the straight pipe portion, wherein the elbow is bent so as to provide for a change in direction of air flowing therethrough.

4. The dryer as claimed in claim 3, wherein the elbow is a bellows pipe.

5. The dryer as claimed in claim 4, wherein the elbow is provided at at least one of a first end where the straight pipe portion is connected to the exhaust hole, or a second end where the straight pipe portion is connected to the hood exhaust pipe.

6. The dryer as claimed in claim 2, wherein the exhaust pipe assembly further includes a hood guide, wherein the hood guide guides the hood exhaust pipe through a pass through hole formed in the wall and secures the hood exhaust pipe to the wall.

7. The dryer as claimed in claim 6, wherein the hood guide comprises at least one substantially flat plate shaped member having an insertion hole formed therein that receives the hood exhaust pipe therein, with fastening holes provided proximate the insertion hole for fastening the hood guide to the wall using fastening members.

8. The dryer as claimed in claim 7, wherein the hood guide includes an inside hood guide that attaches to an interior side of the wall, and an outside hood guide that attaches to an exterior side of the wall.

9. The dryer as claimed in claim 8, wherein the outside hood guide is attached at a lower vertical position than the inside hood guide so that the hood exhaust pipe extending therethrough slopes downward from the interior to the exterior side of the wall.

10. The dryer as claimed in claim 2, wherein the exhaust pipe assembly further includes an end cap provided at the outdoor end of the hood exhaust pipe, wherein the end cap reduces an open sectional area of the outdoor end of the hood exhaust pipe.

11. The dryer as claimed in claim 10, wherein the hood exhaust pipe includes a plurality of exhaust holes formed in an outer circumferential surface portion of the outdoor end of the hood exhaust pipe.

12. The dryer as claimed in claim 10, further comprising connection members that extend between the end cap and the outdoor end of the hood exhaust pipe so as to maintain a predetermined distance between the outdoor end of the hood exhaust pipe and the end cap.

13. The dryer as claimed in claim 12, wherein the end cap includes:
   a cap that is positioned within outdoor end of the hood exhaust pipe; and
   a holding portion that extends from the cap to an outside of the outdoor end of the hood exhaust pipe, wherein the connection members are coupled to the holding portion.

14. The dryer as claimed in claim 13, wherein the cap has a conical shape, and the holding portion is cylindrical.

15. The dryer as claimed in claim 1, wherein the exhaust pipe assembly includes fastening means provided between the wall and the exhaust pipe assembly, wherein the fastening means fastens the exhaust pipe assembly to the wall.

16. The dryer as claimed in claim 15, wherein the fastening means includes:
   a fastening bracket that is fastened to the wall;
   an exhaust pipe holder that surrounds a circumferential surface of the straight pipe portion; and
   an adjusting member that movably couples the exhaust pipe holder to the fastening bracket.

17. The dryer as claimed in claim 16, wherein the adjusting member includes a bolt that varies a distance between the fastening bracket and the exhaust pipe holder based on a rotation of the bolt.

18. The dryer as claimed in claim 16, wherein the exhaust pipe holder includes
   a first holder that surrounds a first circumferential portion of the straight pipe portion; and
   a second holder that surrounds a second circumferential portion of the straight pipe portion, wherein respective opposite ends of the first and second holders are attached such that the attached first and second holders surround the circumferential surface of the straight pipe portion.

19. The dryer as claimed in claim 6, wherein the hood guide closes off a gap formed between an outer circumferential surface of the hood exhaust pipe and an inner circumferential surface of the pass through hole.

20. The dryer as claimed in claim 14, wherein the cap has a conical shape with a closed first end and an open second end, wherein a diameter of the cap gradually increases from the first end to the second end, and wherein the cylindrical holding portion extends out of the outdoor end of the hood exhaust pipe from the second end of the cap.

* * * * *